United States Patent
Barash

(10) Patent No.: US 6,738,740 B1
(45) Date of Patent: May 18, 2004

(54) SPEECH RECOGNITION SYSTEM FOR INTERACTIVELY GATHERING AND STORING VERBAL INFORMATION TO GENERATE DOCUMENTS

(76) Inventor: Kenneth Barash, 159-36 Double Eagle Trail, Del Ray Beach, FL (US) 33446

( * ) Notice: Subject to any disclaimer, the term of this patent is extended or adjusted under 35 U.S.C. 154(b) by 430 days.

(21) Appl. No.: 09/828,087

(22) Filed: Apr. 6, 2001

Related U.S. Application Data

(60) Provisional application No. 60/208,373, filed on May 31, 2000.

(51) Int. Cl.[7] ............................................. G10L 15/26
(52) U.S. Cl. ....................... 704/235; 704/270.1; 705/38; 379/88.18
(58) Field of Search ............................. 704/235, 270.1; 705/38; 379/88.18

(56) References Cited

U.S. PATENT DOCUMENTS

| | | | |
|---|---|---|---|
| 5,007,078 A | * | 4/1991 | Masson et al. ................ 379/75 |
| 5,239,462 A | | 8/1993 | Jones et al. |
| 5,384,701 A | * | 1/1995 | Stentiford et al. .............. 704/3 |
| 5,797,133 A | | 8/1998 | Jones et al. |
| 5,870,721 A | | 2/1999 | Norris |
| 5,878,403 A | | 3/1999 | DeFrancesco et al. |
| 5,940,811 A | | 8/1999 | Norris |
| 5,940,812 A | | 8/1999 | Tengel et al. |
| 5,966,699 A | * | 10/1999 | Zandi ........................... 705/38 |
| 6,021,400 A | * | 2/2000 | Gallacher et al. .............. 705/43 |
| 6,029,149 A | | 2/2000 | Dykstra et al. |
| 6,088,686 A | | 7/2000 | Walker et al. |
| 6,105,007 A | | 8/2000 | Norris |
| 6,144,940 A | * | 11/2000 | Nishi et al. ................... 704/270 |
| 6,157,705 A | * | 12/2000 | Perrone .................... 379/88.01 |
| 6,208,979 B1 | | 3/2001 | Sinclair |
| 6,314,402 B1 | | 11/2001 | Monaco et al. |
| 6,366,892 B1 | | 4/2002 | Altman et al. |
| 6,405,181 B2 | | 6/2002 | Lent et al. |
| 6,438,526 B1 | | 8/2002 | Dykes et al. |
| 6,505,176 B2 | | 1/2003 | DeFrancesco, Jr. et al. |
| 2001/0011246 A1 | | 8/2001 | Tammaro |
| 2001/0037287 A1 | | 11/2001 | Broadbent et al. |
| 2001/0047326 A1 | | 11/2001 | Broadbent et al. |
| 2002/0040339 A1 | | 4/2002 | Dhar et al. |
| 2002/0077970 A1 | | 5/2002 | Lebda et al. |
| 2002/0138411 A1 | | 9/2002 | Monlux et al. |

* cited by examiner

Primary Examiner—Richemond Dorvil
Assistant Examiner—Donald L. Storm
(74) Attorney, Agent, or Firm—Fulbright & Jaworski LLP

(57) ABSTRACT

A voice recognition system and method for interactively gathering information to generate a document, form, or application. An applicant using a remote device to establish a voice connection with the system over a communication network provides verbal responses to a plurality of verbal questions generated by the system. The system stores and converts the verbal responses to a textual document, such as a form or application.

20 Claims, 1 Drawing Sheet

SPEECH RECOGNITION SYSTEM FOR INTERACTIVELY GATHERING AND STORING VERBAL INFORMATION TO GENERATE DOCUMENTS

RELATED APPLICATIONS

This application claims benefit of U.S. Provisional patent Application Serial No. 60/208,373 filed May 31, 2000, which is incorporated herein by reference in its entirety.

BACKGROUND OF THE INVENTION

The present invention relates to method and system for gathering information to generate a document. More specifically, the present invention relates to a voice recognition system for interactively gathering information to generate a document.

For example, the mortgage application process has always been and remains a process that most people fear and dread. The process of gathering the necessary information for most applicants is a torturous procedure from inception to the end. Unfortunately, most information gathers or compilers are not skilled or trained properly to correctly explain the mortgage process to the applicants and collect the necessary information to complete the mortgage application form. As a result, many mortgage applications submitted for processing are incomplete leaving the applicants continually searching for additional supporting documents or explanations. Of course, this tedious process could have been avoided if the applicants were properly informed of the mortgage process. All of this contributes to making the mortgage process a nightmare.

Even with the advent of the Internet, the mortgage process has not become any easier or less pressured in spite of all of the hype and claims associated with the web based products and services. The applicant is still not in control of the process and does not have a complete understanding of the process.

Accordingly, the present invention proceeds upon the desirability of providing a system that simplifies the process, i.e., information gathering process, while at the same time educating the consumer (user or applicant) about the process. The voice recognition system (VRS) of the present invention interactively gathers information from the user to create the necessary documents and forms. For example, the VRS of the present invention insures a faster approval of the credit application and is more cost effective to all parties involved in the transaction, such as the consumer, the creditor and all third party providers. Additionally, the VRS system of the present invention advantageously provides the convenience of data entry by voice.

OBJECTS AND SUMMARY OF THE INVENTION

Therefore, it is an object of the present invention to provide a voice recognition system and technique for interactively gathering information from the user to generate documents.

Another object of the present invention is to provide the voice recognition system and technique as aforesaid, which stores partially completed document to enable a user to complete the incomplete document at a later time.

A further object of the present invention is to provide the voice recognition system and technique as aforesaid, which generates credit investigation documents.

Still another object of the present invention is to provide the voice recognition system and technique as aforesaid, which relays the completed credit investigation documents to a third party underwriting system, such as a lender, Fannie Mae, Freddie Mac, FNMA, FHLMC, PMI, etc.

Yet another object of the present invention is to provide the voice recognition system and technique as aforesaid, which stores the applicant's information, such as personal, financial, etc., that can be accessible only by the applicant to generate other documents.

Still yet another object of the present invention is to provide the voice recognition system and techniques as aforesaid, which interactively gathers information in one language and generates a document in another language.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings and Appendix in which.

DETAILED DESCRIPTION OF THE EMBODIMENTS

Figure 1:
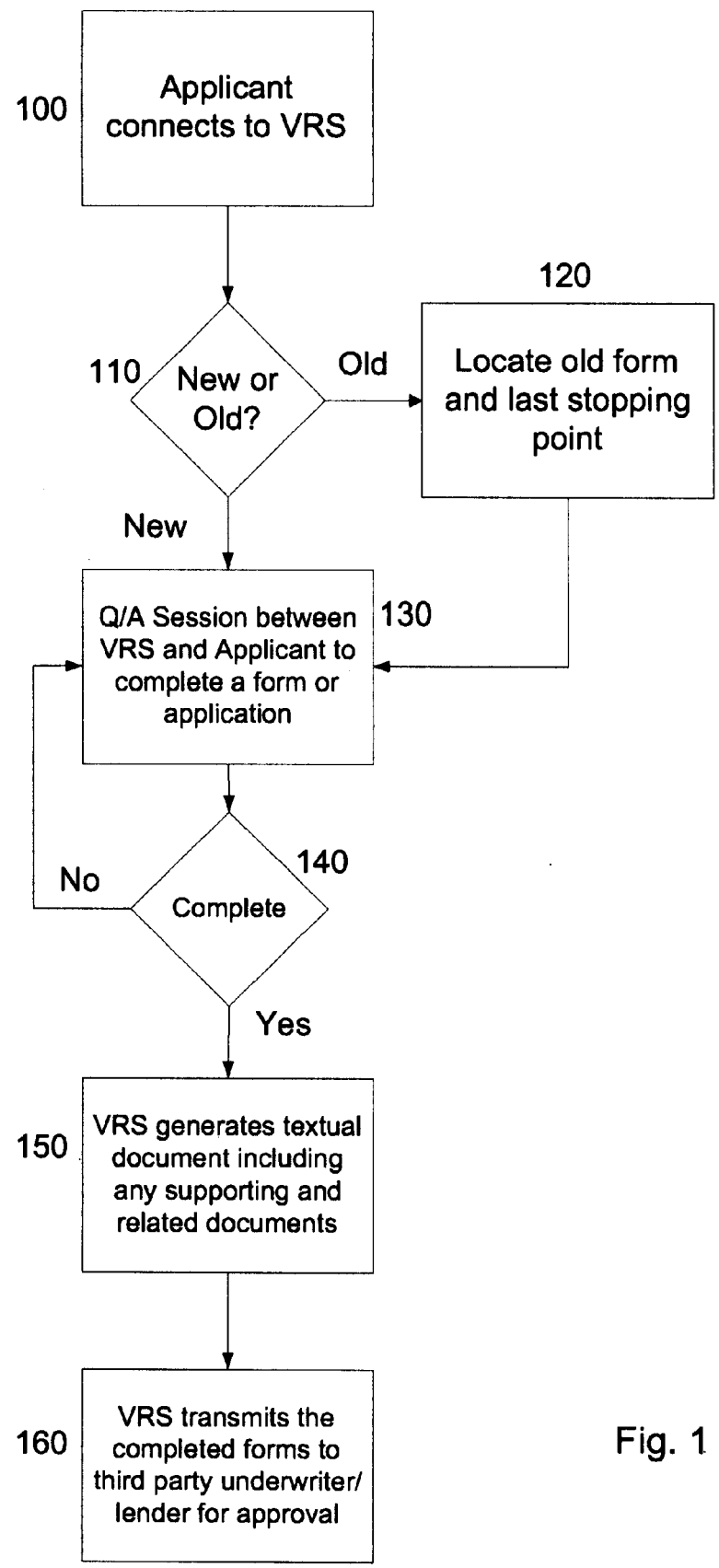
FIG. 1 is a flow chart describing the operation of the present invention.

The voice recognition system (VRS) of the present invention is applicable to the mortgage industry as well as any other industry or any governmental agency (federal, state and local) that requires an individual or business to complete forms, such as credit investigation documents, school application, professional application (i.e., bar application, etc.), governmental forms (immigration/visa forms, income tax returns, etc.). Until, now, the credit investigation for personal approval has been a long, tedious, stressful and inefficient process for most people. The process requires many levels of personnel, from telephone clerks, processors, underwriters, reviewers, closers and management to supervise all of those mentioned.

With the advent of technology and standardization of forms to complete the application, the present invention utilizes a voice recognition system to provide a new process enabling a company to interactively gather the necessary information from people or business to complete the forms with ease and control. That is, the application process, such as the mortgage application process, is totally under the applicant control. The applicant can use the voice recognition system when it is convenient for him and not when it is convenient for the mortgage company, lender or bank. Also, the voice recognition system of the present invention enables the company to replace their current cumbersome, costly and labor intensive process with this convenient and efficient service/process at a lower cost. In other words, the voice recognition system of the present invention may enable companies to automate the process by eliminating unnecessary levels of personnel, thereby creating a more efficient and less costly process.

It is appreciated that the voice recognition system of the present invention may utilize any voice recognition technology to interactively gather information from users to generate documents. Any person or business located anywhere in the world may utilize the voice recognition system of the present invention for any product or service requiring documents, forms or applications.

The present invention is readily implemented by presently available communication apparatus and electronic components. The invention finds ready application in virtually all communication networks that supports voice transmission and integrated reception, including but not limited to the telephone network, wireless network, satellite network, cable network, communications network (i.e., the Internet), etc. Also, the invention finds ready application in virtually all voice input devices connected to one of the above networks, including but not limited, the land telephone, the cellular phone, computer, and other remote access devices.

In accordance with an embodiment of the present invention, the voice recognition system of the present invention is available twenty-four (24) hours a day, seven (7) days a week. Preferably, each user or client (a person or company) is assigned a pin number (or user id) before initiating the system of the present invention to complete a document, application or form. If the client does not complete the application during the session, the pin number will enable the client to access the uncompleted application and finish the uncompleted application in a secured manner. That is, the client can continue with the application from his/her last stopping point. This advantageously eliminates the necessity of starting the application all over from the beginning.

In accordance with another embodiment of the present invention, the applicant can complete another application or form (i.e., in connection with another service or product, another credit application) by simply accessing and modifying the previously completed application, document or form in a secure manner, for example using an assigned pin number. That is, the applicant does not need to complete another application from scratch or re-enter information already provided in connection with another application. For example, the applicant's information, such as address, phone number, employer and the like, can be automatically extracted (retrieved) from existing application to complete another application.

In accordance with an aspect of the present invention, the voice recognition system of the present invention permits user to interrupt the information gathering process with questions. That is, the voice recognition system of the present invention can answer questions verbally posed by the applicant or user, thereby providing immediate assistance to the applicant and resulting in greater percentage of successfully completed application. Preferably, the system of the present invention is capable of detecting when an applicant is having a difficulty with a particular question or a particular section of the application, such as an extensive delay in providing the answer, use of the expression "ugh," or the like. Additionally, if the applicant enters an incorrect or ambiguous information, the voice recognition system of the present invention can take steps to correct such incorrect or ambiguous information, such as editing the information based on other available information, request the applicant for correct information, explain to the applicant what is being asked for, ask for clarification or confirmation, such as when applicant responds with "same or ditto," etc.

In accordance with another aspect of the present invention, the voice recognition system supports multiple languages. That is, the voice recognition system of the present invention can interactively gather information from the user using one language and generate a document, form, application, etc. in another language, such as interact with the client in Spanish and generate a complete application in English, German, French, etc. For example, a person in Japan or a Japanese speaker in U.S. can select to interact in Japanese with the voice recognition system of the present invention to complete a mortgage application in English for a house in New York. Preferably, the voice recognition system of the present invention answers client's or applicant's questions in client's chosen or selected language.

In accordance with an embodiment of the present invention, at any time during the application process, the client may opt or choose to speak with a live operator for a particular question or for additional assistance and then return to automated application process to complete the application. Alternatively, the client may select to continue the application process with a live operator.

After the completion of the information gathering process (i.e., a voice application), the voice recognition system converts and/or translates the voice application to a textual document or application including any mathematical calculations, attachments, appendix, supporting documents, etc. Preferably, the voice recognition system can also translate, if necessary, the voice application in one language to a textual application in another language. The textual application can then be electronically downloaded to a specific or predetermined provider for automated credit approval, such as Fannie Mae, Freddie Mac, etc., within minutes. Approvals include all required information to meet any Federal, state, local or regulatory compliance. Preferably, the VRS notifies applicant and service provider simultaneously by means of voice, print or electronically.

The voice recognition system of the present invention can be utilized in any industry, governmental or commercial, where forms, applications and/or other documents needs to be completed. For example, the present invention finds ready application in many industries, including but not limited to financial, brokerage account, credit card, mortgage, automotive, boat, equipment leasing, tax return, law, insurance, immigration, academia (i.e., school or college applications), etc. Converting voice into text is a giant leap in technology and is vital to this process.

Additionally, the voice recognition system of the present invention prepares and generates all supporting documents to meet each specific requirement of a particular application. These supporting documents can be sent electronically or by other means for review and signature by the applicant if required by the service provider, i.e., lender.

Turning now to FIG. 1, there is illustrated a flowchart describing the process by which an embodiment of the present invention generates and process a mortgage application. For example, an applicant can respond to an advertisement and is supplied with a phone number to call, thereby connecting to and utilizing the voice recognition system (VRS) of the present invention at step 100. The VRS makes an inquiry to determine if the applicant is completing a new application or continuing with an existing application at step 110. If the applicant is completing a new application, the VRS provides a brief description of required information and proceeds to step 130 to complete a new application. Otherwise or if interrupted or the applicant exits for any reason at any time, the applicant can use of the assigned pin number to re-enter the system and proceed with the application at the exited point at step 120. The voice recognition system has the ability to answer questions posed by the client regarding mortgage terminology and can compute and calculate any number associated with the mortgage application, such as the monthly mortgage payment based on the principal of the mortgage or a range of the monthly mortgage payment in accordance with the mortgage rate and/or the term of the mortgage.

The standard documentation required in the mortgage industry is known as the "1003 Form". This standard form can be used to purchase a property located anywhere in the United States or refinance an existing loan. The 1003 Form was developed by the industry from investors known as the Federal National Mortgage Association, better known as FNMA. The FNMA is a United States government sponsored enterprise that purchases mortgage loans from approved seller services throughout the country. The Federal Home Loan Bank Corp. is another government sponsored enterprise that purchases primary residential mortgage loans in the U.S.

It is well known to those skilled in the art that the standard application forms, mortgage programs, products and disclosures are used by thousands of approved seller service providers.

FNMA and FHLM Corp. have developed an artificial underwriting system to accept loan applications through an electronic submission of its standard application. It pulls the borrower's credit history from designated credit repositories. It then process this credit information using a credit screening system and other internal credit requirements to make a value judgment as to the acceptability or inadequacy of this borrower to meet the monthly financial obligation for this specific mortgage loan. The automated underwriting system can also specify conditions for its acceptability, such as listing all the information required from the borrower to provide the credit approval.

This information is then electronically sent to the designated individual or company as a record for this transaction.

Returning to FIG. 1, the voice recognition system of the present invention interactively gathers the information required in these standard mortgage transactions from the applicant or borrower using a verbal question and answer session to walk the applicant through the application process at step 130. The VRS then makes an inquiry at step 140 to determine if the information gathering process is complete. If the inquiry is answered in the negative, then VRS proceeds to step 130 to gather more information from the applicant. If the inquiry is answered in the affirmative, based on the applicant's verbal answers or responses, the voice recognition system of the present invention prepares and generates a completed mortgage application and other documents required in a standard mortgage transaction at step 150, including but not limited to:

1) 1005—mortgage summary of required financial information;

2) GFE—Good Faith Estimate—proposed fees and charges borrowers will have to pay prior to or at time of Settlement, such as approval fees, credit report fees, settlement fees;

3) Truth and Lending—Federal form to explain to the borrower the annual % rate of the loan;

4) Product disclosure—type of mortgage loan and how it works;

5) Financing and Lock In Agreement—An agreement pertaining to the interest rate and fees to a specific interest rate to be guaranteed for a specific time and the fee points;

6) State Specific Closing Disclosure—This applies to each specific state;

7) Settlement Agency Disclosure—Specifies as to who will prepared documents and settlement loan proceeds;

8) Approval Disclosures—right to receive a copy of approval report; and

9) List of all settlement providers used in specific mortgage loan for client

In accordance with the present invention, the voice recognition system is operable to assist the applicant in completing this 1003 Form in its entirety along with any supporting documentation as required by investor or lender, and any federal, state and/or local law, regulation or statute. It is appreciated that the voice recognition system of the present invention may compute certain entries in the form or application using predetermined mathematical formula, e.g., calculating the monthly payment based on the principal amount, the term of the loan and interest rate. If incomplete, inaccurate or ambiguous information is provided by the applicant, the voice recognition system of the present invention informs the applicant that the information provided is either incorrect or incomplete. Preferably, the system may additionally provide an explanation or clarification as to the requisite information.

Upon the completing the information gathering process, i.e., the application, the voice recognition system of the present invention transmits the application to a predetermined automatic underwriting system at step 160. This advantageously permits FNMA/FHLMC/PMI or other third party underwriter/lender to approve the loan in a matter of minutes with/without any conditions. If the borrower application is rejected then the system of the present invention can transmit the application to agencies or companies that services risky credit borrowers or impair credit borrowers. Alternatively, the completed application can be printed and mailed, or transmitted electronically, via facsimile or other comparable means to the applicant for verification and/or execution.

In the event a specific mortgage amount is not specified or requested by the applicant, the voice recognition system of the present invention in conjunction with underwriting system provide the maximum amount of mortgage based upon the applicant's information.

The approval can be transmitted to a specific lender or a group of lenders that will provide the applicant with the terms and conditions of the mortgage as requested by the applicant, such as fixed rate or variable rate mortgage. The selected lender will then deal directly with the applicant to complete the transaction. The requisite documents can be exchanged between the applicant and the lender electronically, by fax or by Internet or any other electronic means to complete the transaction. Preferably, the borrower receives copies of all required documents and completes the mortgage process directly with the lender.

By using the voice recognition system of the present invention, the processing time of a mortgage application (including settlement) may be cut in half, thereby benefiting both the applicant (customer) and the lender. Also, the present process is less stressful, easier and not as tedious to the applicant.

Preferably, the applicant can provide or update his/her information to specific lenders in order to obtain additional credit in advance of his/her needs. The voice recognition system of the present invention advantageously streamlines the loan process. The mortgage process has been known to be a tedious hardship on the borrower because he/she has no control over the process and must give up control of his/her personal and financial information.

For example, in the mortgage application case, the system of present invention enables direct communication between the borrower and other third parties, such as appraisal company, title company, home insurance company, moving company, etc. If a transaction is established or consummated between the borrower and any one of these third parties, the present invention can electronically transmit any required information regarding the borrower to such third party.

While the present invention has been particularly described with respect to the illustrated embodiment, it will be appreciated that various alterations, modifications and adaptations may be made based on the present disclosure, and are intended to be within the scope of the present invention. It is intended that the appended claims be interpreted as including the embodiment discussed above, those various alternatives, which have been described and all equivalents thereto.

What is claimed:

1. A voice recognition system for interactively gathering information from a plurality of users over a communications network, comprising:

a remote device for establishing a voice connection with said system over the communications network;

a processor for generating and transmitting a plurality of verbal questions interactively to a user associated with said remote device to complete a textual document; and a storage device for storing user's verbal responses to said plurality of questions to provide a verbal document; and wherein said processor converts said verbal document into said textual document;

wherein said storage device is operable to store an incomplete verbal document; and wherein said processor generates and transmits remaining unanswered questions to said user in order to complete said verbal document.

2. The system of claim 1, wherein said processor is operable to translate said verbal document in one language into said textual document in another language.

3. The system of claim 1, wherein said processor is operable to generate one or more supporting documents in accordance with said verbal document.

4. The system of claim 1, wherein said textual document is a credit investigation document; and wherein said processor is operable to generate supporting documents for said credit investigation document.

5. The system of claim 4 wherein said processor is operable to transmit said credit investigation document and said supporting documents to a third party for underwriting.

6. The system of claim 4, wherein said processor is operable to transmit said credit investigation document and said supporting documents to a third party for credit approval.

7. The system of claim 4 wherein said processor is operable to transmit said credit investigation document and said supporting documents to a plurality of third parties to bid on the underwriting, and notifying a third party with the best bid and said user associated with said remote device of said third party with the best bid.

8. The system of claim 1, further comprising a device for transmitting said textual document to said user for confirmation or execution.

9. The system of claim 1, wherein said textual document is an application or form.

10. The system of claim 1, wherein said network being one of the following: telephone network, wireless network, satellite network, cable network, and Internet.

11. A voice recognition system for interactively gathering information from a plurality of users over a communications network, comprising:

a remote device for establishing a voice connection with said system over the communications network;

a processor for generating and transmitting a plurality of verbal questions interactively to a user associated with said remote device to complete a textual document; and a storage device for storing user's verbal responses to said plurality of questions to provide a verbal document; and wherein said processor converts said verbal document into said textual document; and wherein said processor is operable to transmit a portion of said textual document to a third party for verification or confirmation.

12. The system of claim 11, wherein said textual document is a credit investigation document; and wherein said processor is operable to generate supporting documents for said credit investigation document.

13. The system of claim 12 wherein said processor is operable to transmit said credit investigation document and said supporting documents to a third party for underwriting.

14. The system of claim 12 wherein said processor is operable to transmit said credit investigation document and said supporting documents to a third party for credit approval.

15. The system of claim 12 wherein said processor is operable to transmit said credit investigation document and said supporting documents to a plurality of third parties to bid on the underwriting, and notifying a third party with the best bid and said user associated with said remote device of said third party with the best bid.

16. The method of interactively gathering information from a plurality of users over a communications network using a voice recognition system, comprising the steps of:

establishing a voice connection with said system over the communications network by a user;

generating and transmitting a plurality of verbal questions interactively to said user to complete a textual document;

storing user's verbal responses to said plurality of questions to provide a verbal document;

generating and transmitting unanswered questions to said user in order to complete said verbal document if it is determined that an incomplete verbal document has been stored; and converting said verbal document into said textual document.

17. The method of claim 16, wherein said textual document is a credit investigation document; and further comprising the step of generating supporting documents for said credit investigation document.

18. The method of claim 17, further comprising the step of transmitting said credit investigation document and said supporting documents to a third party for underwriting.

19. The method of claim 17, further comprising the step of transmitting said credit investigation document and said supporting documents to a third party for credit approval.

20. The method of claim 17, further comprising the steps of:

transmitting said credit investigation document and said supporting documents to a plurality of third parties to bid on the underwriting; and notifying a third party with the best bid and said user of said third party with the best bid.

* * * * *